Feb. 21, 1928.
C. N. DOME
HOE
Filed Feb. 1, 1926
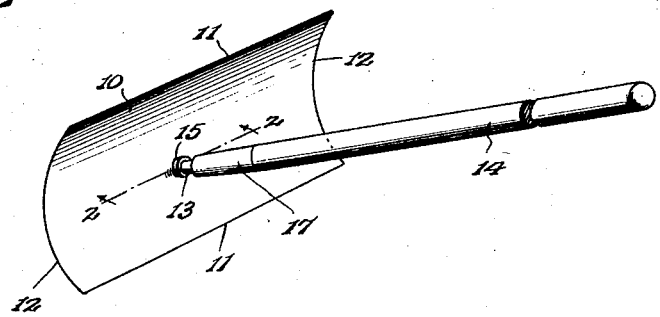
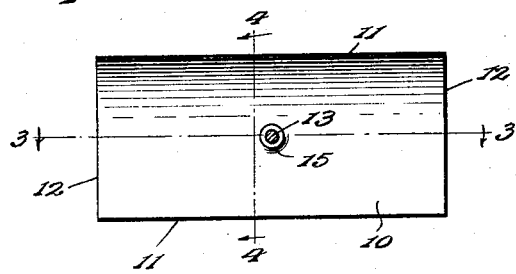
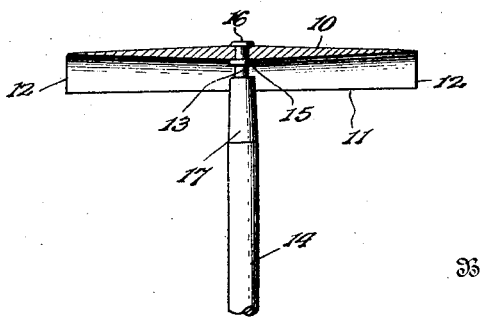
Inventor
C. N. Dome.
By
Attorneys Patented Feb. 21, 1928.

1,659,944

UNITED STATES PATENT OFFICE.

CHARLES N. DOME, OF NEW SALISBURY, INDIANA, ASSIGNOR OF ONE-HALF TO CHARLES W. DOME, OF NEW SALISBURY, INDIANA.

HOE.

Application filed February 1, 1926. Serial No. 85,328.

This invention relates to a grubbing, or weeding hoe for use in the field, or garden, and provides an article embodying a blade of substantially rectangular outline, gradually decreasing in thickness from the center towards its four edges which are sharpened to provide cutters or scrapers.

The invention further provides an implement of the character aforesaid which is light, sturdy, effective and capable of being readily manipulated for a variety of work in the garden, or field.

While the drawings illustrate a preferred embodiment of the invention it is to be understood that in adapting the means to meet specific needs and requirements, the design may be varied, and such other changes in the minor details of construction may be resorted to within the scope of the invention, without departing from the spirit thereof.

For a full understanding of the invention and the merits thereof, reference is to be had to the following description and the drawings hereto attached in which,—

Figure 1 is a perspective view of a hoe embodying the invention,

Figure 2 is a sectional view on the line 2—2 of Figure 1, looking in the direction of the arrows, Figure 3 is a sectional view on the line 3—3 of Figure 2, and Figure 4 is a sectional view on the line 4—4 of Figure 2, looking in the direction of the arrows.

Corresponding and like parts are referred to in the following description and designated in the several views of the drawings by like reference characters.

The hoe comprises a blade 10 which is oblong and approximately of rectangular outline. The blade 10 is thick at a central point and decreases in thickness toward its four edges, as indicated most clearly in the sectional views, Figures 3 and 4. The blade 10 is symmetrically curved transversely between its longitudinal edges which serves to stiffen the same throughout its length, which is of advantage when using one of the ends of the blade. The four edges of the blade are sharpened, as indicated at 11 and 12. The longitudinal cutting edges 11 are straight, whereas the end cutting edges 12 are curved to conform to the transverse curvature of the blade. The blade 10 is pierced at a central point to receive a shank 13 which is attached to a handle 14, the attaching end of the shank being shouldered, as indicated at 15 to obtain a firm bearing against the inner, or concave side of the blade 10. The end of the shank 13 projecting through and beyond the blade is riveted, or upset, as indicated at 16, thereby confining the blade between the elements 15 and 16. The end of the handle 14 receiving the shank 13 is reinforced by means of a ferrule 17.

An essential feature of the invention is the formation of the hoe blade from a rectangular plate gradually decreasing in thickness from a central point, in every direction toward its four edges which are sharpened to provide cutters, thereby admitting of either of the four edges being used, as required, or found most expedient. The implement is particularly adapted for use as a weeder, or grubbing hoe, either in the garden, berry patch, or field, and the size of the blade will depend largely upon the particular use for which the hoe is designed, and the thickness may be uniform or vary as desired to meet requirements and condition of soil.

Having thus described the invention, I claim:

A hoe comprising a rectangular blade of greater length than width and a handle extending rearwardly from the center thereof, said blade being curved transversely for its entire width and crescent-shaped in cross section throughout its entire length and provided with sharpened upper and lower side edges to facilitate cutting into the ground, the inner front and rear faces of the blade converging from its center towards the ends of the blade and intersecting at its ends to provide cutting edges.

In testimony whereof I affix my signature.

CHARLES N. DOME. [L. S.]